United States Patent [19]
Hartman et al.

[11] Patent Number: 5,861,696
[45] Date of Patent: *Jan. 19, 1999

[54] METHODS AND APPARATUS FOR IMPROVED DC MOTORS AND MAGNETIC CLUTCHES

[75] Inventors: Albert L. W. Hartman, Palo Alto; Wendy L. Lorimer, Fremont, both of Calif.

[73] Assignee: Quantum Corporation, Milpitas, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 711,350

[22] Filed: Sep. 4, 1996

[51] Int. Cl.$^6$ .................................................. H02K 21/12
[52] U.S. Cl. ............................................. 310/156; 29/598
[58] Field of Search .................................... 310/156, 254, 310/261; 29/596, 598

[56] References Cited

U.S. PATENT DOCUMENTS

| | | | |
|---|---|---|---|
| 5,006,745 | 4/1991 | Nishio et al. | 310/177 |
| 5,030,864 | 7/1991 | Van Hout et al. | 310/67 R |
| 5,355,043 | 10/1994 | Kaneda | 310/156 |
| 5,418,414 | 5/1995 | Ackermann et al. | 310/156 |
| 5,652,473 | 7/1997 | Delamare et al. | 310/90.5 |

OTHER PUBLICATIONS

Zhu et al., "Instantaneous Magnetic Field Distribution in Brushless Permanent Magnet dc Motors, Part I: Open–Circuit Field", IEEE Transactions on Magnetics, vol. 29, No. 1, Jan. 1993.

Ackermann, et al., "New Technique for reducing cogging torque in a class of brushless DC motors", IEE Proceedings–B, vol. 139, No. 4, Jul., 1992.

*Primary Examiner*—Nestor Ramirez
*Assistant Examiner*—Michael J. Wallace, Jr.
*Attorney, Agent, or Firm*—Beyer & Weaver; David B. Harrison

[57] ABSTRACT

A method for manufacturing a direct current motor having a stator and a rotor. The stator has a first number of slots, and the rotor includes a permanent magnet having a second number of alternately magnetized poles. The method includes calculating a magnetization pattern based on a magnetizing construct associated with said direct current motor, which magnetizing construct includes a hypothetical magnetizing stator having the same number of magnetizing teeth as the second number of alternately magnetized poles. The method further includes having the permanent magnet magnetized with substantially the calculated magnetization pattern, thereby forming the direct current motor.

20 Claims, 4 Drawing Sheets

METHODS AND APPARATUS FOR IMPROVED DC MOTORS AND MAGNETIC CLUTCHES

BACKGROUND OF THE INVENTION

The present invention relates to direct current (dc) motors and magnetic clutches. More particularly, the present invention relates to methods and apparatus for improving the efficiency of permanent magnet brushless dc motors and magnetic clutches.

Figure 1:
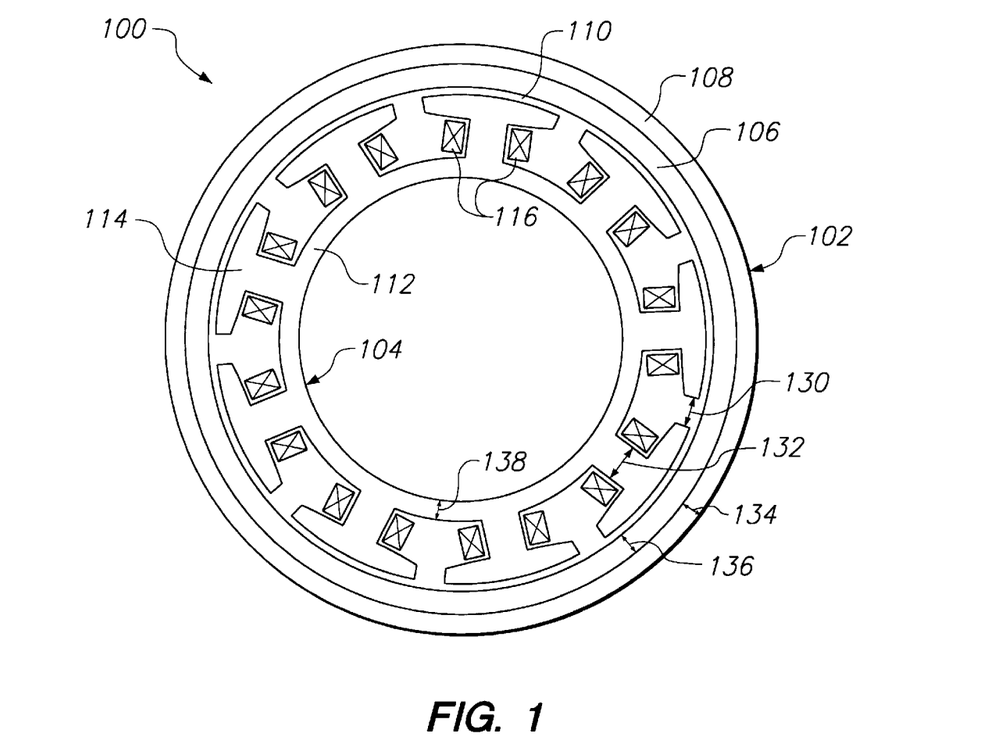
FIG. 1 illustrates, to facilitate discussion, a diagrammatic sectional view of a spindle motor, representing a typical permanent magnet brushless dc motor.

Permanent magnet brushless dc motors and magnetic clutches are known in the art. To facilitate discussion, FIG. 1 is a diagrammatic sectional view of a spindle motor 100, representing a typical permanent magnet brushless dc motor. The spindle motor is selected herein for discussion to facilitate ease of understanding although, as will be seen, the inventive concepts disclosed herein apply equally well to other types of direct current motors (e.g., other types of radial gap dc motors, axial gap dc motors, external stator dc motors, and the like), and magnetic clutches. Spindle motor 100 includes a rotor portion 102 that is rotatable about a stationary stator portion 104. Rotor portion 102 has a multi-pole permanent magnet 106 mounted to a back yoke 108 and is typically formed of a continuous ring of a suitable magnet material. Magnet 106 is typically magnetized in segments, with adjacent segments being alternately magnetized in opposite directions. Back yoke 108 serves as a return path and may be formed of soft iron or steel.

Stator portion 104 is separated from rotor portion 102 by a generally cylindrical air gap 110. Stator portion 104 includes a stator yoke 112 having stator teeth 114, typically formed of laminated sheets of soft iron or silicon steel, with stator teeth 114 oriented toward rotor portion 102 and carrying excitation coils 116. Stator portion 104 is typically supported on a base plate support structure (omitted from FIG. 1 to improve clarity).

As is well known to those skilled in the art, rotor portion 102 is induced to rotate about stator portion 104 when excitation coils 120 are electrically energized. Although all dc motors convert electrical energy in the form of current through their excitation coils into the rotor's rotational force, they do so at various levels of efficiency. In general, a dc motor having a high level of efficiency is desirable over a less efficient dc motor. High efficiency motors tend to generate less heat and noise during operation and usually operate for a longer period of time for a given battery charge. These considerations are particularly important for manufacturers of computer disk drives, as these devices are often employed heat and/or noise sensitive environments, or in battery-operated portable computers.

In the design of dc motors, it is known that the magnetization pattern in the dc motor magnet, e.g., magnet 106 of FIG. 1, has a strong effect on motor efficiency. Designers of dc motors constantly search for patterns that, all things being equal, yield the highest level of efficiency. Once a suitable pattern is selected, it may then be furnished to a magnetizing fixture designer who, using conventional techniques, designs a magnetizing fixture to reproduce as closely as possible in the motor magnet the desired magnetization pattern.

Figure 2A:
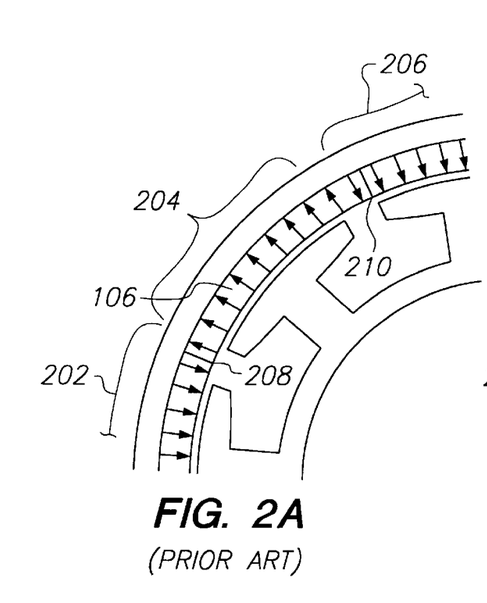
FIG. 2A illustrates a portion of the spindle motor of FIG. 1, including a portion of the motor's permanent magnet having a purely radial magnetization pattern.

It is widely believed that the most efficient magnetization pattern in the dc motor magnet is a purely radial pattern. To facilitate further discussion, FIG. 2A illustrates a portion of spindle motor 100 of FIG. 1, including permanent magnet 106 having a purely radial magnetization pattern. Within permanent magnet 106, adjacent magnet segments are alternately magnetized in opposite directions. This is illustrated in the magnetization lines of magnet segments 202, 204, and 206 (depicted in FIG. 2A as series of parallel arrows in cylindrical permanent magnet 106).

In the purely radial magnetization pattern of FIG. 2A, the magnetization lines are radial throughout permanent magnet 106, including magnetization lines that are adjacent to the segment boundaries. Across a segment boundary, i.e., the imaginary line that distinguishes a magnet segment from its adjacent neighbor, magnetization lines of a purely radial magnetization pattern are oriented in opposite directions right next to one another. This condition is illustrated in FIG. 2A at boundaries 208 and 210, which separate respective adjacent magnet segment pairs 202/204 and 204/206. It should be noted that although the purely radial pattern of FIG. 2A has long been held by many to be the most efficient, it is difficult to manufacture economically.

It is also known that dc motors employing the purely radial magnetization pattern of FIG. 2A would suffer from high cogging forces. Cogging forces represent a well known phenomenon, and are generally a result of preferred angular position that the rotor has due to the magnetics. A high level of cogging forces adversely affects motor performance, particularly in the ability of the rotor to smoothly rotate about the stator. Excessive cogging forces may also lead to an unacceptably high level of acoustic noise. Consequently, while manufacturers strive to achieve the highest efficiency level believed to be associated with the purely radial magnetization pattern, other alternative magnetization patterns have been developed to achieve an acceptable tradeoff between high efficiency and high cogging forces and/or high manufacturing costs.

Figure 2B:
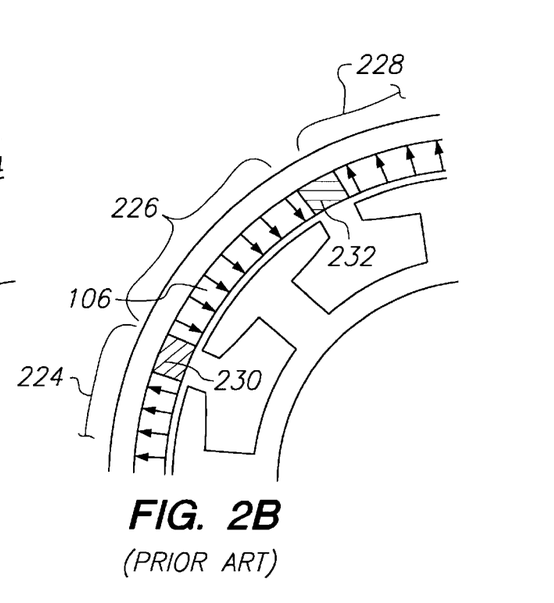
FIG. 2B illustrates a prior art magnetization pattern that includes unmagnetized dead zones.

With these alternative magnetization patterns, however, it has been found that motor efficiency is reduced. FIG. 2B illustrates one such alternative magnetization pattern, wherein the boundaries between adjacent magnet segments 224/226 and 226/228 are intentionally expanded into unmagnetized transition regions 230 and 232. The unmagnetized transition regions between adjacent magnet segments are known as dead zones since no magnetization lines exist in these unmagnetized transition regions. In the regions that are magnetized, e.g., within magnet segments 224, 226, and 228 of FIG. 2B, the magnetization lines are kept substantially radial. However, the presence of the unmagnetized transition regions, or dead zones, robs the dc motor of a portion of its driving force, resulting in a concomitant reduction in the level of motor efficiency.

Another approach involves sinusoidal magnetization lines, with the orientation of a given magnetization line being determined by its angular position from the boundary between adjacent magnet segments. In accordance with this sinusoidal magnetization scheme, each magnetization line has a radial component which varies from about 90° (almost purely radial) at the center of a magnet segment to almost 0° at the segment boundary. Such an approach is described in, for example, U.S. Pat. No. 5,418,414, issued to Ackermann, et al. However, the efficiency of the motor that results has been found to be lower than the efficiency level of an analogous dc motor employing the purely radial magnetization pattern.

In view of the foregoing, improved methods and apparatus for magnetizing permanent magnets in dc motors or magnetic clutches are desired. The improved methods and apparatus preferably yield a dc motor or a magnetic clutch that can operate with a high level of efficiency.

SUMMARY OF THE INVENTION

The present invention relates to highly efficient dc motors and magnetic clutches and methods for manufacturing the same. DC motors and magnetic clutches manufactured in accordance with the present invention employ a novel self-generated magnetization pattern in their permanent magnets.

In one embodiment, the self-generated magnetization pattern is calculated using a magnetizing construct associated with the dc motor to be produced, a hypothetical magnetizing stator, and a hypothetical magnet. The hypothetical magnetizing stator represents a stator modeled for calculation purposes, and has the same number of magnetizing teeth as the number of poles in the permanent magnet of the dc motor. The hypothetical magnet represents a magnet also modeled for calculation purposes, and has the same permeability as the permeability of the permanent magnet of the motor to be manufactured, albeit with no flux generation abilities. The magnetizing construct employed for calculating the self-generated magnetization pattern preferably has the same general geometry as the geometry of the dc motor to be produced. In this manner, the self-generated magnetization pattern calculated is uniquely matched to the geometry of the dc motor to be manufactured, thereby greatly improving efficiency.

In another embodiment, the invention relates to a method for manufacturing a dc motor having a stator and a rotor. The stator has a first number of slots, and the rotor includes a permanent magnet having a second number of alternately magnetized poles. The method includes the step of calculating a magnetization pattern based on a magnetizing construct associated with the dc motor, which magnetizing construct includes a hypothetical magnetizing stator having the same number of magnetizing teeth as the second number of alternately magnetized poles. The method further includes the step of having the permanent magnet magnetized with substantially the calculated magnetization pattern, thereby forming the dc motor.

In yet another embodiment, the invention relates to a dc motor, which includes a stator having a first number of slots and a rotor. The rotor includes a permanent magnet having thereon a self-generated magnetization pattern with magnetization lines uniquely matched to the geometry of the dc motor and the number of poles of the permanent magnet.

In yet another embodiment, the invention relates to a method for forming a permanent magnet configured for use in a dc motor having a stator and a rotor. The stator has a first number of slots, and the rotor includes the permanent magnet having a second number of alternately magnetized poles. The method includes the step of providing the permanent magnet in its unmagnetized state. There is further included the step of providing a self-generated magnetization pattern. The self-generated magnetization pattern represents magnetization lines calculated using a magnetizing construct associated with the dc motor to be formed and a hypothetical magnetizing stator having the same number of magnetizing teeth as the second number of alternately magnetized poles. The method also includes the step of magnetizing, using a magnetizing fixture, the permanent magnet with substantially the self-generated magnetization pattern.

These and other advantages of the present invention will become apparent upon reading the following detailed descriptions and studying the various figures of the drawings.

BRIEF DESCRIPTION OF THE DRAWINGS

Pig. 3 illustrates, in accordance with one aspect of the present invention, the procedure employed to derive the self-generated magnetization pattern (SGMP) for a particular dc motor configuration.

DETAILED DESCRIPTION OF THE PREFERRED EMBODIMENTS

An invention is described herein for improving the efficiency of dc motors and magnetic clutches. In the following description, numerous specific details are set forth in order to provide a thorough understanding of the present invention. It will be apparent, however, to one skilled in the art, that the present invention may be practiced without some or all of these specific details. In other instances, well known structures and/or process steps have not been described in detail in order not to unnecessarily obscure the present invention.

For ease of discussion, the following detailed description is made with reference to a dc motor. It should be kept in mind, as pointed out earlier, that the inventive concepts disclosed herein apply equally well to other types of direct current motors (e.g., other types of radial gap dc motors, axial gap dc motors, external stator dc motors, and the like), and magnetic clutches. In accordance with one aspect of the present invention, the efficiency of a dc motor may be substantially improved when its permanent magnet is magnetized with a novel, improved magnetization pattern. The improved magnetization pattern, referred to herein as the self-generated magnetization pattern (SGMP), advantageously results in a dc motor having an efficiency level that is higher than prior art motors having the magnetization pattern of FIG. 2B (i.e., with dead zones between adjacent magnet segments). In fact, dc motors produced with the inventive SGMP have an efficiency level that is even higher than the efficiency level theoretically calculated for analogous dc motors employing the purely radial magnetization pattern of FIG. 2A (which have not been susceptible to economical production).

In accordance with one aspect of the invention, the self-generated magnetization pattern (SGMP) for a particular dc motor configuration depends, at least in part, on parameters that are specific to the motor to be designed, e.g., its geometry, the desired number of poles (magnet segments in the motor magnet) and slots (stator teeth). These configuration-specific parameters, when employed in conjunction with the inventive calculation technique disclosed herein, enables the self-generating magnetization pattern to be calculated using, for example, known numerical analysis techniques. This is unlike the prior art approaches wherein magnetization patterns are not specific to the geometry of the dc motor to be produced. While not wishing to be bound by theory, it is believed that the gain in efficiency observed in dc motors employing the inventive self-generated magnetization pattern (SGMP) is derived, at least in part, from the fact that the magnetization lines of the SGMP are uniquely matched to the geometry and the number of poles and slots of the dc motor to be designed.

Once the SGMP for a particular dc motor configuration is calculated, it may be furnished, as mentioned earlier, to any competent magnetizing fixture designer (such as Nihon Denji Sokki Co., Ltd (Tokyo, Japan)) to facilitate the construction of a magnetizing fixture capable of substantially reproducing the furnished self-generated magnetization pattern in production motor magnets. The design of an appropriate magnetizing fixture for a particular magnetization pattern is the domain of magnetizing fixture designers, and may be accomplished using any number of techniques well known to designers of magnetizing fixtures including inside and outside magnetizing conductor(s), shaped steel magnetizing yokes, and the like.

Figure 3:
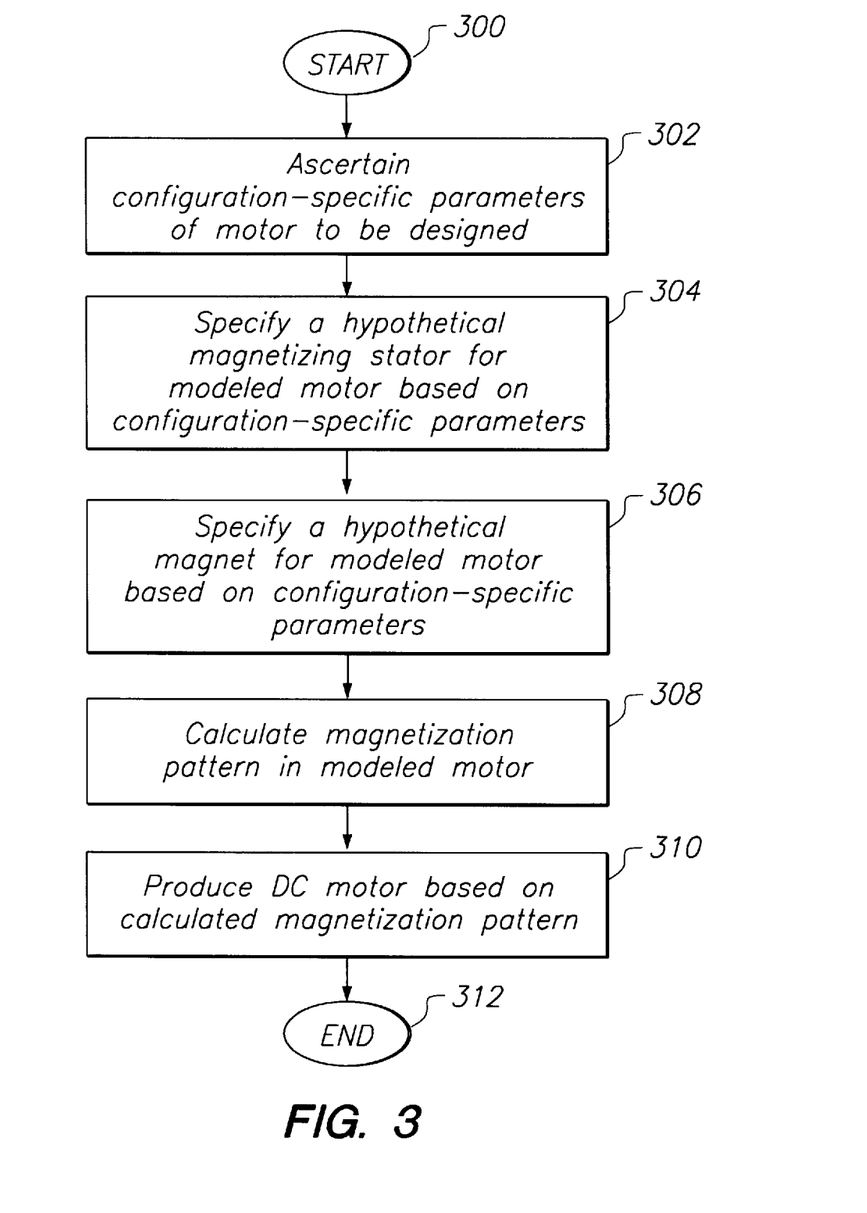

Since the magnetization lines of the inventive SGMP are unique to each dc motor configuration, generalizations about their orientation for a generic dc motor cannot be meaningfully offered. However, the generation of such a self-generated magnetization pattern (SGMP) for a particular dc motor configuration may be accomplished, in one embodiment, by the technique described below. FIG. 3 illustrates, in accordance with one aspect of the present invention, the procedure employed to derive the self-generated magnetization pattern (SGMP) for a particular dc motor configuration. In step 302, the geometry and the number of poles/slots of the dc motor to be designed are first ascertained. The relevant configuration-specific-parameters that are useful in deriving the self-generated magnetization pattern are discussed in greater detail in a subsequent FIG. 4 herein.

In step 304, a hypothetical magnetizing stator (HMS), representing the stator employed for the purpose of calculating the SGMP, is specified. The magnetizing stator specified in step 304 is hypothetical since it may not have the same specification as the stator employed in the finished, i.e., operational, dc motor. In accordance with one aspect of the present invention, the hypothetical magnetizing stator is specified to have the same number of magnetizing teeth as the number of poles in the finished motor magnet. This is a novel and nonobvious step in the magnetization pattern calculation procedure since the stator in the finished dc motor typically has a different number of stator teeth than the number of poles in the motor's permanent magnet.

The hypothetical magnetizing stator of step 304 preferably has about the same permeability and the same slot opening as the slot opening of the operational stator in the finished motor. With reference to FIG. 1, the slot opening refers to the separation between adjacent stator teeth (shown in FIG. 1 as slot opening 130 and is typically measured in degrees of arc). The magnetizing teeth are preferably wound alternately clockwise and then counterclockwise with a conductive coil, and all are connected together in a single loop. In this manner, the coils are wound such that adjacent magnetizer teeth are alternately energized north and south.

The magnet back yoke of the magnetizing construct associated with the dc motor, which magnetizing construct is modeled for calculation purposes, preferably has about the same dimension and permeability as that of the motor to be designed. The air gap, e.g., air gap 110 of FIG. 1, between the hypothetical magnetizing stator and the inner surface of the magnet is about the same as that of the finished motor. Preferably, all other dimensions and parameters of the hypothetical magnetizing stator not specifically mentioned herein also approximate closely those of the operational stator in the finished motor.

In step 306, a hypothetical magnet is specified for the purpose of calculating the self-generated magnetization pattern. The hypothetical magnet, which is employed in the magnetizing construct for calculation purposes, preferably has about the same dimension and permeability as the permanent magnet in the finished dc motor. However, the hypothetical magnet is preferably specified as having substantially no flux generating abilities. It should be kept in mind that the hypothetical magnetizing stator (HMS) of step 304 and the hypothetical magnet of step 306 do not necessarily represent actual physical entities and may merely represent mathematical models to be employed in the calculation of the self-generated magnetization pattern for the dc motor being designed.

In step 308, the hypothetical magnetizing stator (HMS) and the hypothetical magnet (specified in steps 304 and 306 respectively) are employed to calculate the self-generated magnetization pattern in the magnet of the motor to be designed. This calculation involves, in one embodiment, determining the flux directions that would occur when the coils surrounding the hypothetical magnetizing stator teeth are electrically energized in the magnetizing construct. Note that the inventive magnetization calculation procedure described herein is novel and nonobvious from prior art approaches, which attempt to either mimic the heretofore uneconomical purely radial magnetization pattern throughout a magnet segment, or to modify the magnetization lines in a predefined, e.g., sinusoidal, manner without taking into account the geometry of the finished motor, its number of poles/slots, or employing the novel hypothetical magnetizing stator (HMS) and/or hypothetical magnet in the calculation.

In one embodiment, the inventive self-generated magnetization pattern is calculated using a numerical analysis technique known as finite element analysis (FEA). For example, calculation may be accomplished using a software product known as Ansys (Ver. 5.0A), available from Ansys Inc. of Houston, Pa., and using parameters associated with the hypothetical magnetizing stator, the hypothetical magnet, and other dimensions associated with the dc motor to be designed. The use of a numerical analysis technique to derive the magnetic field for a properly modeled dc motor is familiar to those skilled in the art.

Note that although finite element analysis (FEA) is employed in this embodiment to calculate the self-generated magnetization pattern, other numerical analysis techniques such as boundary element analysis, finite difference, and the like, may well be employed. Calculation may be performed for the entire ring of permanent magnet, or for only a portion of the permanent magnet if desired. If symmetry exists, the calculated self-generated magnetization pattern within a portion of the permanent magnet may then be replicated to generate the required magnetization pattern for the entire magnet ring.

In step 310, the calculated self-generated magnetization pattern is provided to a magnetizing fixture designer. As mentioned earlier, the furnished magnetization pattern and other parameters enable the construction, using known magnetizing fixture design techniques, of a magnetizing fixture capable of substantially reproducing the furnished magnetization pattern in production motor magnets. It is expected that the highest level of efficiency for a dc motor is achieved when the reproduced magnetization pattern substantially approximates that of the self-generated magnetization pattern, which is specifically calculated for that dc motor.

Figure 4:
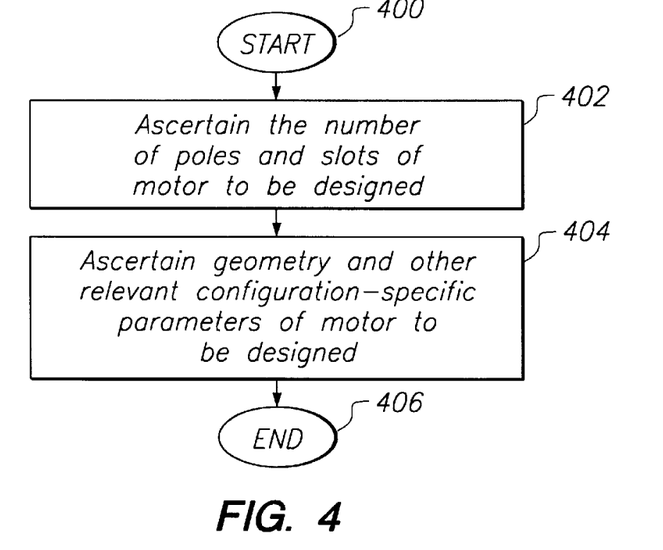
FIG. 4 illustrates, in accordance with one aspect of the present invention, the steps involved in ascertaining the configuration-specific parameters of a dc motor to facilitate the subsequent calculation of that motor's self-generated magnetization pattern (SGMP).

FIG. 4 illustrates, in accordance with one aspect of the present invention, step 302 of FIG. 3, wherein the configuration-specific parameters of a dc motor is determined to facilitate the specification of the hypothetical magnetizing stator (HMS), the hypothetical magnet, and the subsequent calculation of the self-generated magnetization pattern (steps 304, 306, and 308 of FIG. 3). In step 402, the number of poles and slots of the motor to be designed is selected. In step 404, other configuration-specific parameters are also ascertained. With reference to FIG. 1, these parameters include, for example, the cross-sectional dimension of stator (104), the width of the stator teeth (132), the air gap between the stator teeth and the magnet's surface (reference number 110 and generally specified to be as small as possible to minimize losses), slot opening (130), and the thickness values of the rotor yoke (134), magnet (136), and stator yoke (138). As mentioned earlier in connection with step 304 of FIG. 3, the parameters associated with the hypothetical magnetizing stator, with the exception of the number of magnetizing teeth, preferably approximate the configuration-specific parameters of the stator in the finished dc motor. Likewise, the parameters associated with the hypothetical magnet, with the exception of its flux generation abilities, preferably approximate the configuration-specific parameters of the permanent magnet in the finished dc motor. In fact, other parameters of the magnetizing construct modeled for the purpose of calculating the SGMP preferably approximate respective parameters in the finished dc motor as well. In this manner, the derived self-generated magnetization pattern is matched to the geometry of the finished motor, thereby improving efficiency.

Figure 5:
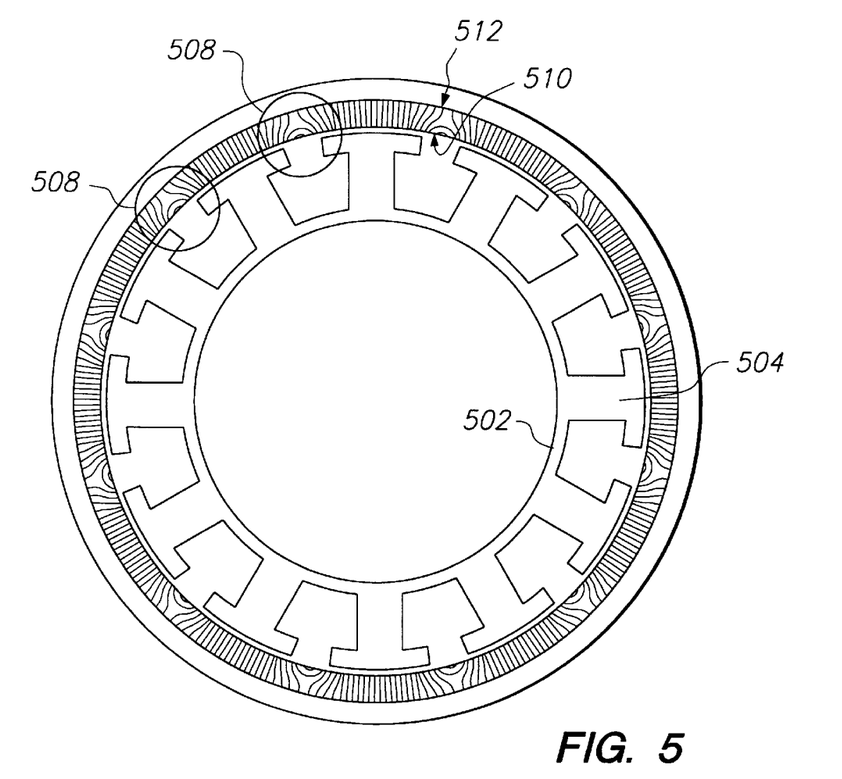
FIG. 5 illustrates, in accordance with one embodiment of the present invention, the magnetization lines of the calculated self-generated magnetization pattern for an exemplar 9-slot 12-pole dc motor with 10° slot openings.

FIG. 5 illustrates, in accordance with one embodiment of the present invention, the magnetization lines of the calculated self-generated magnetization pattern for an exemplar 9-slot 12-pole dc motor with 10° slot openings. Hypothetical magnetizing stator 502, which has the same number of magnetizing teeth 504 as the number of poles (magnet segments) in the magnet to be produced, is also shown in FIG. 5 to improve understanding. Note that hypothetical magnetizing stator 502 is provided with the same number of magnetizing teeth 504 as the number of poles of the finished motor, e.g., 12 in the present example, irrespective of the fact that the stator of the dc motor to be designed only has 9 slots (i.e., stator teeth).

Adjacent magnet segments in the self-generated magnetization pattern of FIG. 5 are alternately magnetized in opposite directions. Further, there exist magnetization lines in transition areas 508 of the self-generated magnetization pattern. This pattern in transition areas 508 comprises flux lines, as shown in FIG. 5, of two different orientations. The transition areas 508 have flux lines proximate a central portion of the transition area 508 which are substantially circumferential in orientation near an inner circumferential wall portion 510 of magnet 106, and flux lines proximate circumferential edge portions of the transition area 508 which are substantially radial in orientation between the inner circumferential wall portion 510 and an outer circumferential wall portion 512 of the magnet 106 such that a radial to circumferential to radial flux line orientation gradient exists within each transition area 508. This is unlike the prior art magnetization pattern of FIG. 2B, wherein the transition zones between adjacent magnet segments are designed as dead zones, i.e., substantially devoid of magnetization lines. It is believed that the presence of magnetization lines in these transition zones allows the self-generated magnetization pattern to more efficiently translate electrical energy in the excitation coils into rotational forces.

Note that the orientation of the magnetization lines in accordance with the self-generated magnetization pattern does not vary sinusoidally with their angular positions. As stated earlier, the orientation of the magnetization lines of the self-generated magnetization pattern does not vary in a generic, predefined manner for dc motors of all configuration, e.g., sinusoidally as in the Ackermann patent, but instead depends on the configuration-specific parameters of each motor and are uniquely matched to the motor geometry and its number of poles/slots.

Figure 6:
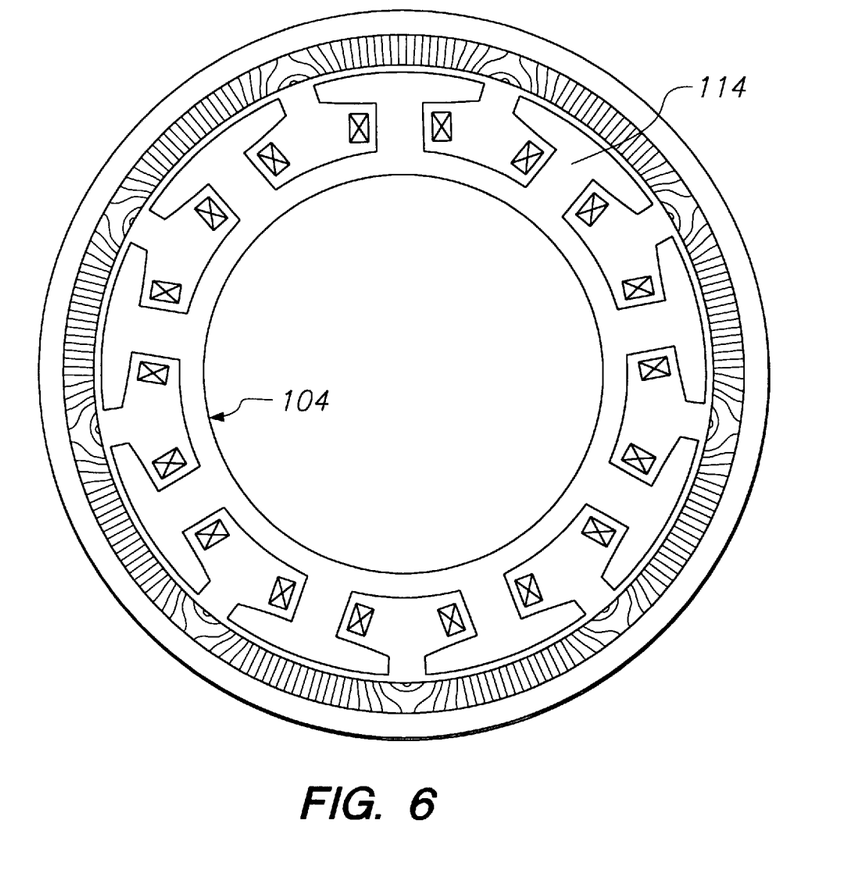
FIG. 6 shows a diagrammatic sectional view of the dc motor of FIG. 5 in its finished state, including its magnetization lines.

For illustration purposes, FIG. 6 shows a top sectional view of the dc motor of FIG. 5 in its finished state. In FIG. 6, the self-generated magnetization pattern, which is derived in accordance with the technique disclosed herein and illustrated in FIG. 5, has been substantially reproduced in a permanent manner in permanent magnet 106 via an appropriately designed magnetizing fixture. In contrast to the hypothetical magnetizing stator 502 of FIG. 5, stator 104 only has the specified nine stator teeth 114.

As mentioned earlier, dc motors employing the inventive self-generated magnetization pattern show substantial efficiency improvement over analogous dc motors that employ either the purely radial magnetization pattern, the magnetization pattern having dead zones of FIG. 2B, or the sinusoidal magnetization pattern. Motor efficiency is typically measured by a well known value known as the motor constant. The motor constant for a particular dc motor is proportional to the ratio of the motor's torque constant divided by the square root of its resistance. It has been found in some experiments that the efficiency improvement is at least 3–10% over what was previously thought of as the highest possible efficiency, i.e., the motor constant calculated for analogous dc motors employing the purely radial magnetization pattern. The amount of efficiency improvement depends in part on the number of poles/slots of a particular dc motor.

While this invention has been described in terms of several preferred embodiments, there are alterations, permutations, and equivalents which fall within the scope of this invention. By way of example, although the inventive concept has been discussed, for ease of illustration, with reference to a dc motor having a stationary shaft, the present invention applies equally well to other dc motor designs, e.g., exterior stator motors, axial gap motors, or the like. The dc motor itself may have its coils separated to form a multi-phase motor, e.g., a three-phase motor, and may have any number of poles and/or slots.

Further, the present inventive concept also applies equally well to magnetic clutches to, for example, maximize torque transfer. The self-generated magnetization patterns (SGMP) for these latter devices can be produced by those skilled in the art using procedures analogous to that disclosed herein and employing modifications readily apparent to them in view of this disclosure. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for manufacturing a direct current motor having a stator and a rotor, said stator having a first number of slots, comprising:

provi­ding on a rotor a cylindrical permanent magnet with a second number of alternately magnetized poles and providing transition regions between the alternately magnetized poles in the cylindrical permanent magnet with a magnetization pattern based on a magnetizing construct associated with said direct current motor, said magnetizing construct including a hypothetical magnetizing stator having the same number of magnetizing teeth as said second number of alternately magnetized poles to magnetize said permanent magnet, such that the alternately magnetized poles are magnetized with radial flux lines and wherein the transition regions have flux lines proximate a central portion of the transition regions which are substantially circumferential in orientation near an inner circumferential wall portion of the permanent magnet adjacently facing the stator and flux lines proximate circumferential edge portions of the transition regions adjacent the alternately magnetized poles; which are substantially radial in orientation between the inner circumferential wall portion and an outer circumferential wall portion of the permanent magnet away from the stator, such that a radial to circumferential to radial flux line orientation gradient exists within each transition region; and forming said direct current motor with said permanent magnet within said rotor thereof.

2. The method of claim 1 wherein adjacent ones of said magnetizing teeth of said hypothetical magnetizing stator is separated by a first slot opening that is substantially equal to a second slot opening between adjacent ones of said slots of said stator.

3. The method of claim 1 wherein said magnetizing teeth of said hypothetical magnetizing stator are alternately wound clockwise and counterclockwise with a conductive coil.

4. The method of claim 3 wherein said conductive coil is continuous through said hypothetical magnetizing stator.

5. The method of claim 1 wherein adjacent ones of said magnetizing teeth of said hypothetical magnetizing stator are magnetized in opposite directions.

6. The method of claim 1 wherein said magnetizing construct further includes a hypothetical magnet, said hypothetical magnet having substantially no flux generation abilities.

7. The method of claim 6 wherein said hypothetical magnet of said magnetizing construct has substantially the same permeability as said permanent magnet of said direct current motor.

8. The method of claim 6 wherein said magnetizing construct has a first air gap dimension between said hypothetical magnetizing stator and said hypothetical magnet, said first air gap dimension being substantially equal to an air gap dimension between said stator and said permanent magnet in said direct current motor.

9. The method of claim 6 wherein said direct current motor is a three-phase motor and the number of stator slots is an integer multiple of three.

10. The method of claim 6 wherein said stator of said direct current motor is coupled to a support structure, said rotor being rotatable about said stator.

11. The method of claim 6 wherein said direct current motor is of an external stator design.

12. The method of claim 6 wherein said direct current motor represents an axial gap motor.

13. The method of claim 1 wherein said direct current motor represents a computer disk drive motor.

14. The method of claim 1 wherein said magnetization pattern is unique to a geometry of said direct current motor.

15. The method of claim 1 wherein said magnetizing construct has a back yoke having a first dimension and a first permeability substantially equal to a respective second dimension and second permeability of a back yoke of said direct current motor.

16. A direct current motor, comprising:

a stator having a first number of slots; and a rotor, including
a permanent magnet having thereon a magnetization pattern with magnetization lines uniquely matched to a geometry of said direct current motor and a number of poles of said permanent magnet, said magnetization pattern in said permanent magnet having alternately magnetized poles magnetized with radial flux lines and having a magnetic transition region between adjacent poles of said magnet, the transition region having flux lines proximate a central portion of the transition region which are substantially circumferential in orientation at an inner wall portion of said magnet adjacently facing the stator and having flux lines proximate circumferential edge portions adjacent the alternately magnetized poles which are substantially radial in orientation at between the inner wall portion and an outer wall portion of said magnet away from the stator, such that a radial to circumferential to radial flux line orientation gradient exists within the transition region.

17. The direct current motor of claim 16 wherein said magnetization pattern defines magnetization lines uniquely matched to a geometry of said direct current motor and the number of poles of said permanent magnet, said magnetization pattern substantially representing a magnetization pattern calculated when coils wound around teeth of a hypothetical magnetizing stator are electrically energized in a magnetizing construct associated with said direct current motor, said magnetizing construct further including a hypothetical magnet, said hypothetical magnet having a first permeability substantially equal to a permeability of said permanent magnet, said hypothetical magnet further having substantially no flux generation abilities.

18. A method for forming a permanent magnet configured for use in a direct current motor having a stator and a rotor, said stator having a first number of slots comprising:

providing a permanent magnet having a second number of alternately magnetized poles on a rotor;

providing said permanent magnet in its unmagnetized state;

providing a magnetization pattern, said magnetization pattern defining alternately magnetized poles having radial flux lines and having a magnetic transition region between adjacent poles of said magnetization pattern defining substantially circumferential flux lines to be located at a central portion of the transition region near an inner wall portion of said permanent magnet adjacently facing the stator and defining substantially radial flux lines between the inner wall portion and an outer wall portion of said permanent magnet oppositely away from the stator, the substantially radial flux lines to be located at edge portions of the transition region adjacent the alternately magnetized poles, such that the magnetization pattern defines a radial to circumferential to radial flux line orientation gradient within the magnetic transition region; and magnetizing, using a magnetizing fixture, said permanent magnet with substantially said magnetization pattern.

19. The method of claim 18 wherein said magnetizing pattern comprises a self-magnetizing pattern said self-generated magnetization pattern representing magnetization lines calculated using a magnetizing construct associated with said direct current motor, said magnetizing construct including a hypothetical magnetizing stator having the same number of magnetizing teeth as said second number of alternately magnetized poles, and wherein said magnetizing teeth of said hypothetical magnetizing stator are alternately wound clockwise and counterclockwise with a continuous conductive coil.

20. The method of claim 19 wherein said magnetizing construct further includes a hypothetical magnet, said hypothetical magnet having a first permeability substantially equal to a permeability of said permanent magnet, said hypothetical magnet further having substantially no flux generation abilities.

* * * * *